United States Defensive Publication [19] (H) [11] T995,004

Lawson [43] Jun. 3, 1980

[54] FLAME RESISTANT ACRYLONITRILE-BUTADIENE STYRENE COMPOSITIONS

[75] Inventor: David F. Lawson, Akron, Ohio

[73] Assignee: The Firestone Tire & Rubber Co., Akron, Ohio

[21] Appl. No.: 708,518

[22] Filed: Jul. 26, 1976

Related U.S. Application Data

[63] Continuation of Ser. No. 597,860, Jul. 21, 1975, abandoned.

[51] Int. Cl.[2] ..... C08K 5/56; C08K 5/06

[52] U.S. Cl. ..... 260/45.75 P; 260/45.95 G; 525/4

[57] ABSTRACT

The flammability of acrylonitrile-butadiene-sytrene resin is significantly decreased by adding thereto a combination of a brominated aromatic ether and iron or chromium naphthenate.

The brominated aromatic ethers which may be used are illustrated by the generalized structure:

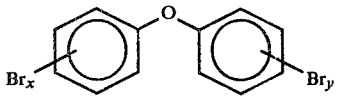

in which x is 2 to 5 and y is 0 to 5, provided x plus y equals at least 2. Examples of these compounds include decabromodiphenyl oxide, octabromodiphenyl oxide, hexabromodiphenyl oxide, pentabromodiphenyl oxide or tetrabromodiphenyl oxide.

The ABS resins which can be treated include the terpolymer produced by polymerization of acrylonitrile, butadiene and stryene monomers, as well as terpolymers produced by grafting acrylonitrile and styrene on polybutadiene, or blends of the component polymers.

1 Claim, No Sheets Drawing,

15 Pages Specification

The file of this unexamined application may be inspected and copies thereof may be purchased (849 O.G. 1221, Apr. 9, 1968).